United States Patent [19]

Rainville

[11] Patent Number: 5,019,994
[45] Date of Patent: May 28, 1991

[54] METHOD AND APPARATUS FOR DRYING ARTICLES IN A CONTINUOUS FEED PROCESS

[75] Inventor: Donald D. Rainville, Manassas, Va.

[73] Assignee: Universal Dynamics Corporation, Woodbridge, Va.

[21] Appl. No.: 359,218

[22] Filed: May 31, 1989

[51] Int. Cl.⁵ .................. G05D 23/24; F26B 21/10
[52] U.S. Cl. ............................ 364/477; 34/28; 34/31; 34/48; 219/388
[58] Field of Search .............. 364/477, 557, 138; 219/10.55 F, 385, 388; 34/22, 25, 26, 28, 30, 43, 54, 55, 48, 31; 55/217; 236/1 B, DIG. 8

[56] References Cited

U.S. PATENT DOCUMENTS

| | | | |
|---|---|---|---|
| 3,861,054 | 1/1975 | Stahl | 34/10 |
| 4,043,050 | 8/1977 | Hancock | 34/48 |
| 4,112,589 | 9/1978 | Palfrey et al. | 34/48 |
| 4,195,415 | 4/1980 | Livings et al. | 34/48 |
| 4,209,915 | 7/1980 | Keuleman et al. | 34/48 |
| 4,257,170 | 3/1981 | Gestblom et al. | 34/48 |
| 4,267,643 | 5/1981 | Haried | 34/48 |
| 4,286,391 | 9/1981 | Gerry | 34/44 |
| 4,413,426 | 11/1983 | Gräff | 34/27 |
| 4,704,805 | 11/1987 | Kaya et al. | 34/31 |
| 4,750,273 | 6/1988 | Parkes et al. | 34/30 |
| 4,773,168 | 9/1988 | Lamos et al. | 34/48 |
| 4,777,604 | 10/1988 | Robinson | 364/477 |
| 4,800,653 | 1/1989 | Steffen | 34/30 |
| 4,860,460 | 8/1989 | Gaudreau et al. | 34/26 |

Primary Examiner—Jerry Smith
Assistant Examiner—Paul Gordon
Attorney, Agent, or Firm—James A. Drobile; Robert A. Koons, Jr.

[57] ABSTRACT

A method for drying articles flowing through a drying chamber by introducing heated air into the drying chamber. In normal steady-state operation, the inlet and outlet temperatures of the air are monitored, and the inlet temperature is maintained at a normal operating inlet temperature. When the inlet and outlet temperatures approach each other, a stoppage or reduction of the normal steady-state flow of the articles is indicated, in response to which the inlet temperature is reduced to an energy saving temperature. After the inlet temperature is reduced to the energy saving temperature, monitoring of the inlet and outlet temperatures continues. When the difference between the energy saving inlet temperature and the outlet temperature increases, resumption of the normal steady-state flow of the articles is indicated, and in response thereto the inlet temperature is increased from the energy saving temperature to the normal operating inlet temperature. A drying apparatus that carries out the method of the invention has a drying chamber with an article inlet aperture, an article outlet aperture, an air inlet aperture, and air outlet aperture formed therein. The dryer apparatus further includes an inlet temperature sensor, an outlet temperature sensor, a blower, a heater, and an electronic controller.

22 Claims, 3 Drawing Sheets 5,019,994

METHOD AND APPARATUS FOR DRYING ARTICLES IN A CONTINUOUS FEED PROCESS

BACKGROUND OF THE INVENTION

The invention relates to drying of articles in a process whereby articles are placed in a drying chamber and a heated drying medium is propelled through and among the articles. The invention more particularly relates to such a process where articles continuously, or at intervals, enter a drying chamber in an undried form and exit the drying chamber in a dried form. The invention relates still more particularly to the drying or preheating of plastics or plastic resins in particulate form in such a process.

Plastics and plastic resins used in various production processes are generally manufactured in the form of small particles known as "pellets." When such particles are hygroscopic in nature, they absorb moisture readily and, as a result, generally have a moisture content that is too high for use in many plastic production processes. Accordingly, such particles must be dried prior to being used in subsequent production processes. Moreover, even if the particles are not hygroscopic in nature, they often must be "dried" so that they are pre-heated before they are used in subsequent production process. Conventionally, the drying process involves blowing a stream of heated air through a quantity of the plastic particles that are held in a hopper or other drying chamber. It is also possible to have the particles continuously enter the top of the drying chamber and exit at the bottom of chamber. In such a continuous drying process, the flow rate of the particles generally is adjusted so that the particles, upon exiting the drying chamber, have been exposed to a stream of heated air for a length of time that is adequate to "dry" them, i.e., lower their moisture content or pre-heat them to the desired level.

It has developed that, in such continuous feed processing and drying of plastic pellets and other types of particles, there frequently are stoppages or reductions in the throughput of the particles into and out of the drying chamber. Such stoppages or reductions in throughput may occur for any number of reasons, including routine changing of molds or other "downstream" equipment in various plastic production operations. Regardless of the reasons for such stoppages or reductions in throughput, when they occur, all of the particles in the drying chamber reach an optimum dried condition in a short time period. When the optimum dried condition is reached, no further useful drying occurs and energy is wasted by continuing to heat the air or other drying medium that enters the drying chamber and is blown around and through the particles. In the event heating of the air continues, particles such as plastic pellets may become overheated and begin to degrade or congeal into a solid mass that is unusable in subsequent production processes, with the result that the drying chamber must be dismantled and cleaned and the degraded or congealed particles discarded. Moreover, merely turning off the flow of heated air does not satisfactorily solve this problem because the particles simply will cool off and reabsorb moisture from the ambient air, thereby requiring that additional energy be expended to re-dry them when the flow of heated air through the drying chamber is resumed.

Certain non-continuous or "batch" processes for drying or pre-heating various types of articles are known in the art. In such non-continuous processes, the moisture content of the articles may be estimated based on the behavior of the temperature of the drying medium exiting the drying chamber or by comparison of the temperature of the drying medium before it enters the drying chamber to the temperature of the drying medium after it exits the drying chamber. Depending upon the desired reduction in moisture content or desired level of pre-heating, such non-continuous processes can be "adjusted" by increasing or decreasing the drying time of the particles, i.e.. by allowing a particular batch of articles to remain in the drying chamber for a greater or lesser time period. Thus, for example, in Robinson, U.S. Pat. No. 4,777,604, there is disclosed a method of drying wood products which involves measuring the temperature of a drying medium before and after it contacts the wood products, calculating a difference in these temperatures and, based on this difference, adjusting either the drying time or the temperature of the drying medium before contact with the wood products.

In many continuous feed drying operations, however, adjusting the drying time is not feasible because the length of time the particles are retained in the drying chamber is dictated and controlled by the material feed requirements of "downstream" production processes. Moreover, in present continuous feed processes, it is difficult to control the drying operation by adjusting the temperature of the incoming drying medium, particularly in view of the overriding requirement in most processes that the particles continuously exiting the drying chamber must be thoroughly dried. As a result, during normal operation of known continuous drying processes, the temperature of the drying medium entering the drying chamber generally is maintained at a constant level. This, however, can be wasteful of energy and often results in overdrying of the particles, particularly in those situations where there is a stoppage or reduction in the throughput of the particles being dried, as described above.

OBJECTS OF THE INVENTION

It is an object of this invention to provide a method for drying articles in a continuous feed process involving the passing of a heated drying medium over and through the articles to be dried, wherein wasting of energy and overdrying of the articles during stoppages or reductions in the process are avoided.

It is a further object of this invention to provide a method and apparatus for drying articles in a continuous feed process, wherein the articles may be maintained in a properly dried condition during stoppages or reductions in the drying operation so that, upon resumption of the drying operation, appropriate quantities of the articles may be delivered to "downstream" production processes without unnecessary delay.

It is yet another object of this invention to provide a method of drying plastic in particulate form in a continuous feed process of the type in which heated air is passed over and through the plastic particles to be dried, and wherein degradation or melting of the particles is prevented during stoppages or reductions in the continuous feed process.

These and other objects of the invention will be better appreciated after reading the succeeding description of the invention in conjunction with the accompanying drawings.

SUMMARY OF THE INVENTION

The disclosed invention provides a method for drying a plurality of articles involving the continuous feed of the articles into and out of a drying chamber through which, during normal steady-state operation, a drying medium heated to a normal operating inlet temperature is continuously propelled. The disclosed invention provides a process including the further steps of detecting stoppages or reductions in the flow of articles, in response thereto reducing the inlet temperature of the drying medium to an energy saving temperature suitable for maintaining in a properly dried condition the articles remaining in the drying chamber, thereafter detecting a resumption of normal steady-state flow of articles through the drying chamber and, in response to such resumption of normal steady-state flow, resuming drying of the articles entering the drying chamber by increasing the inlet temperature of the drying medium to the normal operating inlet temperature.

The disclosed invention also provides a process that includes the steps of monitoring the normal operating inlet temperature of the drying medium before it contacts the articles and the outlet temperature of the drying medium after it contacts the articles, calculating the difference between the normal operating inlet temperature and the outlet temperature of the drying medium, and comparing this calculated difference with a first pre-selected temperature difference. If the calculated difference between the normal operating inlet temperature and the outlet temperature of the drying medium drops below a first pre-selected temperature difference, a stoppage or reduction in the flow of particles is indicated. In the event of such a stoppage or reduction, the disclosed invention next involves the step of reducing the inlet temperature of the drying medium to a pre-selected energy saving inlet temperature, which energy saving inlet temperature is lower than the normal operating inlet temperature of the drying medium. The invention further involves the steps of calculating the difference between the energy saving inlet temperature and the outlet temperature of the drying medium, and thereafter comparing this calculated temperature difference to a second pre-selected temperature difference. If the calculated difference between the energy saving inlet temperature and the outlet temperature of the drying medium is greater than the second pre-selected temperature difference, resumption of normal steady-state flow of articles through the drying chamber is indicated. In that event, the invention involves the further step of increasing the inlet temperature of the drying medium from the energy saving level to the normal operating inlet temperature.

The disclosed invention also relates to an apparatus that includes a drying chamber with an inlet aperture near the top of the chamber for entry of articles to be dried and an outlet aperture for discharge of the dried articles at the bottom of the chamber. One or more inlet apertures or vents are provided in or near the bottom of the drying chamber for entry of the heated drying medium, and one or more outlet apertures or vents are provided in or near the top of the drying chamber for exit of the drying medium after it has passed around and through the articles in the drying chamber. One or more heaters are positioned in the path of the drying medium immediately before it enters the drying chamber through the inlet vent or vents. A blower is provided to propel the drying medium through the heaters and into the drying chamber. A first thermocouple or other appropriate temperature sensor is provided in the flow path of the drying medium after it is heated but before it contacts the articles to be dried, and a second thermocouple or other appropriate temperature sensor is provided in the flow path of the drying medium after it has contacted the articles in the drying chamber.

The amount of heat transferred to the drying medium by the heater is regulated by an electro-mechanical or electronic controller. In the manner of the process of the invention described above, the controller calculates the difference between the normal operating inlet temperature and the outlet temperature of the drying medium. The controller thereafter compares this calculated temperature difference to a first pre-selected temperature difference indicative of a stoppage or reduction in the flow of articles through the drying chamber. When this calculated temperature difference drops below the first pre-selected temperature difference, the controller causes a reduction in the amount of heat transferred by the heater to the drying medium. The inlet temperature of the drying medium is thereby decreased from the normal operating inlet temperature to a lower energy saving inlet temperature.

After the inlet temperature of the drying medium has been reduced to the energy saving level, the controller calculates the difference between the energy saving inlet temperature and the outlet temperature of the drying medium. The controller next compares this temperature difference to a second pre-selected temperature difference which is indicative of a resumption of normal steady-state flow of articles through the drying chamber. When the difference between the energy saving inlet temperature and the outlet temperature of the drying medium exceeds the second pre-selected temperature difference, thereby indicating that normal steady-state flow of the articles through the drying chamber has resumed, the controller causes the heater to transfer additional heat to the drying medium so that its inlet temperature is increased to the normal operating level.

DETAILED DESCRIPTION OF THE PREFERRED EMBODIMENT OF THE INVENTION.

Figure 1:
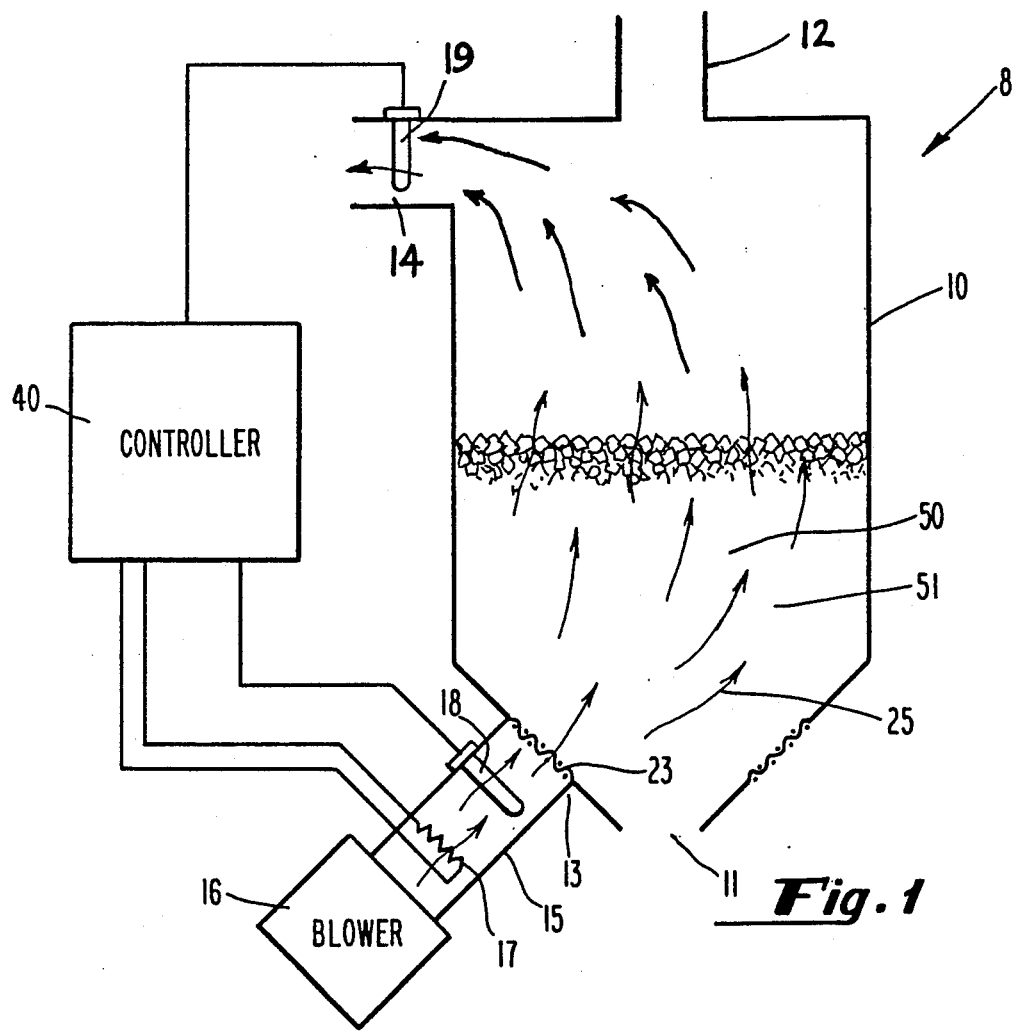
FIG. 1 is a preferred embodiment of an apparatus of the invention showing the drying chamber, heater, blower, and temperature sensors in elevational view and the controller as a block diagram.

Viewing FIG. 1, it will be seen that a preferred embodiment of the invention includes, generally, a dryer 8 which includes a drying chamber or hopper 10 having a cylindrical horizontal cross-section and an inverted frusto-conically shaped floor or bottom surface which terminates in an article outlet aperture 11. An article inlet aperture 12 is proVided in the upper portion of drying chamber 10. The lower portion of the drying chamber 10 has at least one drying medium inlet vent or aperture 13 with a screen or similar covering 23 that allows the passage of the drying medium into the drying chamber 10 but does not allow articles 50 to fall into inlet vent or aperture 13. The drying medium inlet aperture 13 may be formed in the bottom surface of the drying chamber 10. At least one drying medium outlet vent or aperture 14 at the top of the drying chamber 10 allows the passage of the drying medium out of drying chamber 10. In normal steady-state operation, the articles to be dried enter drying chamber 10 through article inlet aperture 12, form a bed of articles 50 and remain in drying chamber 10 for a suitable period of time before exiting drying chamber 10 in a dried condition (i.e. with a moisture content decreased to a point considered desirable for further processing) through article outlet aperture 11. For descriptive purposes, the portion of the drying chamber occupied in normal operation by the bed of articles 50 is defined as a drying zone 51.

Before entering drying chamber 10, the drying medium—which in the preferred embodiment is air—travels through a drying medium conduit 15 which is connected to drying medium inlet aperture 13. In drying medium conduit 15, the air encounters a blower 16. Blower 16 propels the air in a flow path indicated generally by arrows 25. As shown in FIG. 1, the air is propelled through heater 17 and inlet vent 13, into drying chamber 10, and thereafter through and around articles 50 being dried. After passing through and around articles 50, the air exits drying chamber 10 through outlet vent 14. In the preferred embodiment, heater 17 is of the radiant electric type that is well-known in the art. Inlet temperature sensor 18, which in the preferred embodiment is a thermocouple but may also be a thermistor or other appropriate temperature sensing device, is located in the flow path of the air after it is propelled through heater 17 but before it enters drying zone 51 or contacts the bed of articles 50 in drying chamber 10. Outlet temperature sensor 19, which in the preferred embodiment is a thermocouple but may also be a thermistor or other appropriate temperature sensing device, is located in outlet vent 14. Alternatively, outlet temperature sensor 19 need not be located in outlet vent 14 but instead may be located in the upper portion of drying chamber 10 above drying zone 51. In any event, outlet temperature sensor 19 is located in the flow path of the air after it has passed through the bed of articles 50, i.e., outlet temperature sensor 19 is located in the flow path of the air and above the drying zone 51. Controller 40, which is explained in more detail by reference to FIG. 2, is electrically connected to heater 17 and to both inlet temperature sensor 18 and outlet temperature sensor 19.

During normal steady-state operation of dryer 8, the temperature of the incoming air heated by heater 17 and measured by inlet temperature sensor 18 is maintained at a pre-determined normal operating inlet temperature. It will be appreciated that, in normal steady-state drying operation, the instantaneous temperature of the air will be decreased continuously by its passage through and around articles 50 as a result of the transfer of energy from the air to articles 50 during the pre-heating or evaporation of moisture from articles 50. As a result, the temperature of the air measured by outlet temperature sensor 19 will be lower than the temperature of the air measured by inlet temperature sensor 18. When there is a stoppage or reduction in the flow of articles 50, such as where articles 50 are plastic pellets and it is necessary to change "downstream" molds or other equipment (not shown), articles 50 will neither enter drying chamber 10 through article inlet aperture 12 nor exit through article outlet aperture 11 at normal steady-state flow rates. Thus, in these circumstances, the particular particles 50 that are "trapped" in drying chamber 10 during the stoppage or reduction in flow will rapidly approach a dried condition. As articles 50 approach such a dried condition, the amount of heat energy transferred by the air to articles 50 is significantly reduced, with the result that the outlet temperature of the air sensed by outlet temperature sensor 19 will rapidly approach the normal operating inlet temperature of the air sensed by inlet temperature sensor 18. Controller 40 calculates a temperature difference between the normal operating inlet temperature, measured by inlet temperature sensor 18, and the outlet temperature measured by outlet temperature sensor 19, and compares this calculated temperature difference to a first pre-selected temperature difference. This first pre-selected temperature difference is selected by an operator to be indicative of a stoppage or reduction in normal steady-state flow of articles 50 through drying chamber 10, and is stored by controller 40. When the difference between the normal operating inlet temperature of the air sensed by inlet temperature sensor 18 and the outlet temperature of the air sensed by outlet temperature sensor 19 falls below the first pre-selected temperature difference, controller 40 causes a reduction in the amount of energy transferred to the air by heater 17 so that the inlet temperature of the air is decreased from the normal operating inlet temperature to a lower temperature, referred to for descriptive purposes as the energy saving inlet temperature. The energy saving inlet temperature is selected by an operator so that it is adequate to maintain articles 50 in a dried condition while not wasting energy or overheating articles 50 to the point that they congeal or otherwise are degraded. Controller 40 stores the energy saving inlet temperature after it is selected by an operator.

After the inlet temperature of the drying medium sensed by inlet temperature sensor 18 has been reduced to the energy saving level, controller 40 calculates the difference between the energy saving inlet temperature sensed by inlet temperature sensor 18 and the outlet temperature of the air sensed by outlet temperature sensor 19. Controller 40 next compares this temperature difference to a second pre-selected temperature difference, stored by controller 40, which has been selected by an operator to be indicative of a resumption in normal steady-state flow of articles 50 into and out of drying chamber 10. After normal flow of articles 50 resumes, articles in an undried state enter the drying chamber through article inlet 12 and are added to the top of the bed of articles 50 at the normal steady-state flow rate. As the air flowing through drying chamber 10 contacts any of articles 50 that are in an undried state, moisture in such articles 50 is evaporated and the temperature of the air is reduced. In this situation, the outlet temperature of the air detected by the outlet temperature sensor 19 will decrease, thereby increasing the difference between the energy saving inlet temperature and the outlet temperature of the air. When this temperature difference exceeds the second pre-selected temperature difference, controller 40 will cause the inlet temperature of the air, as sensed by inlet temperature sensor 18, to be increased by heater 17 from the energy saving level to the normal operating inlet temperature which is appropriate for the normal steady state operation of dryer 8.

Figure 2:
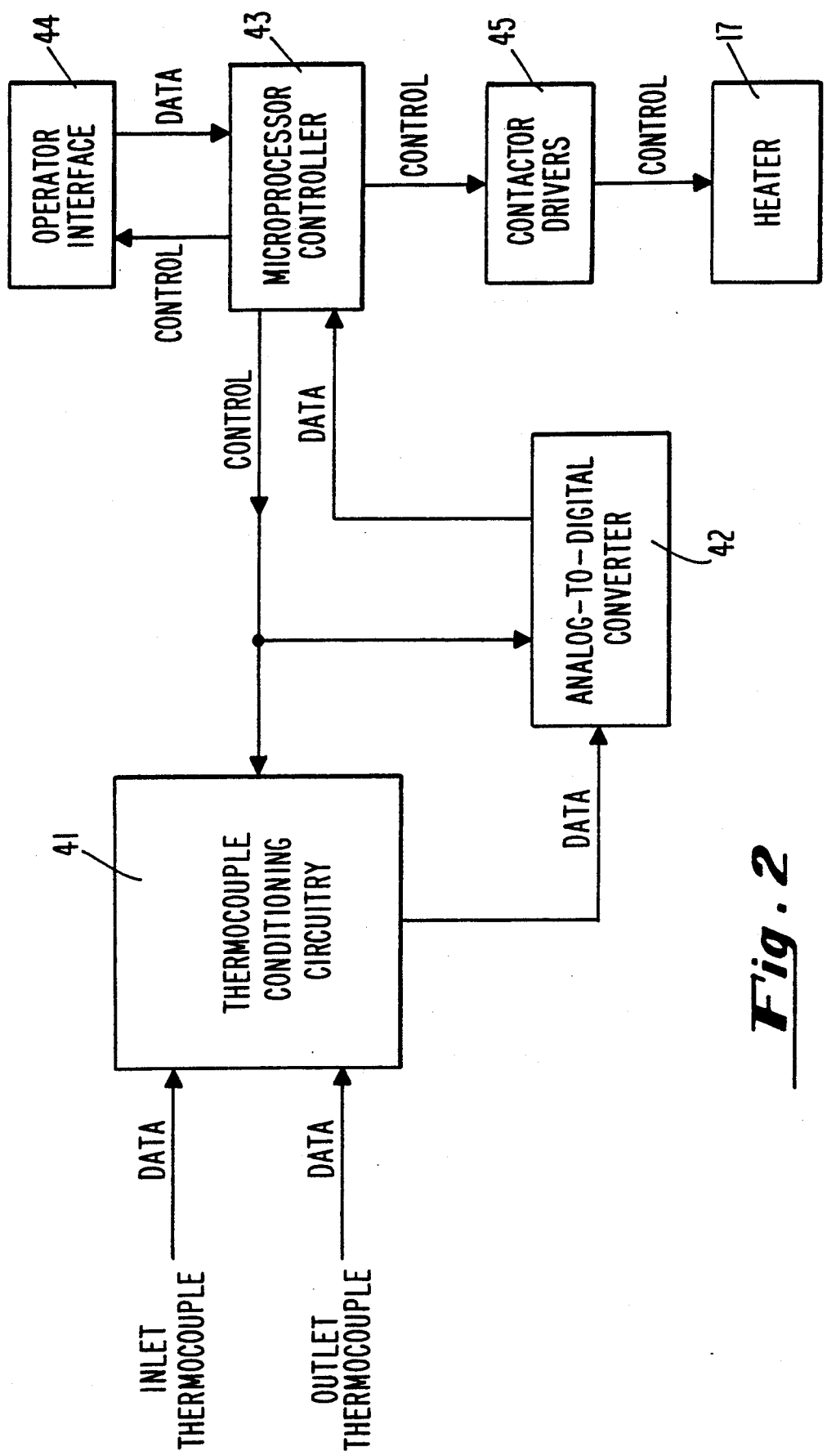
FIG. 2 is a schematic view of the block diagram of the controller of the invention in the preferred embodiment.

FIG. 2 shows in schematic form the components and operation of controller 40 which may be of the electro-mechanical type, but in the preferred embodiment is electronic. As shown in FIG. 2, inlet temperature sensor 18 and outlet temperature sensor 19 are connected to thermocouple conditioning circuitry 41, the configuration of which may be any one of numerous configurations for such circuitry that are well-known in the art. Temperature data from thermocouple conditioning circuitry 41 is then transmitted to an analog-to-digital converter 42, which similarly may conform to numerous designs that are well-known in the art. The data is then transmitted from analog-to-digital converter 42 to a microprocessor controller 43. Microprocessor controller 43 receives from an operator interface 44 data regarding (1) the normal operating inlet temperature of the drying medium in normal steady state operation of the dryer; (2) the first pre-selected difference between the inlet and outlet temperatures of the drying medium; (3) the energy saving inlet temperature of the drying medium; and (4) the second pre-selected difference between the inlet and outlet temperatures of the drying medium. Operator interface 44 may be composed of a keyboard and display that employ any one of a large number of designs well-known in the art and which function to allow the operator to select and input to microprocessor controller 43 the four data items set forth immediately above. Microprocessor controller 43 controls the operation of operator interface 44 in accordance with circuitry and software techniques that are well-known in the art of electronic design. Microprocessor controller 43 stores the data and similarly controls the operation of thermocouple conditioning circuitry 41 and analog-to-digital converter 42 in accordance with circuitry and software techniques that are well-known in the art of electronic design. Microprocessor controller 43 stores the various data and processes it in accordance with the logic that is explained hereafter in connection with FIG. 3. Microprocessor controller 43 instructs contactor drivers 45, which are well-known in the art of controlling drivers, and contactor drivers 45 in turn control the transfer of heat to the drying medium by heater 17.

Figure 3:
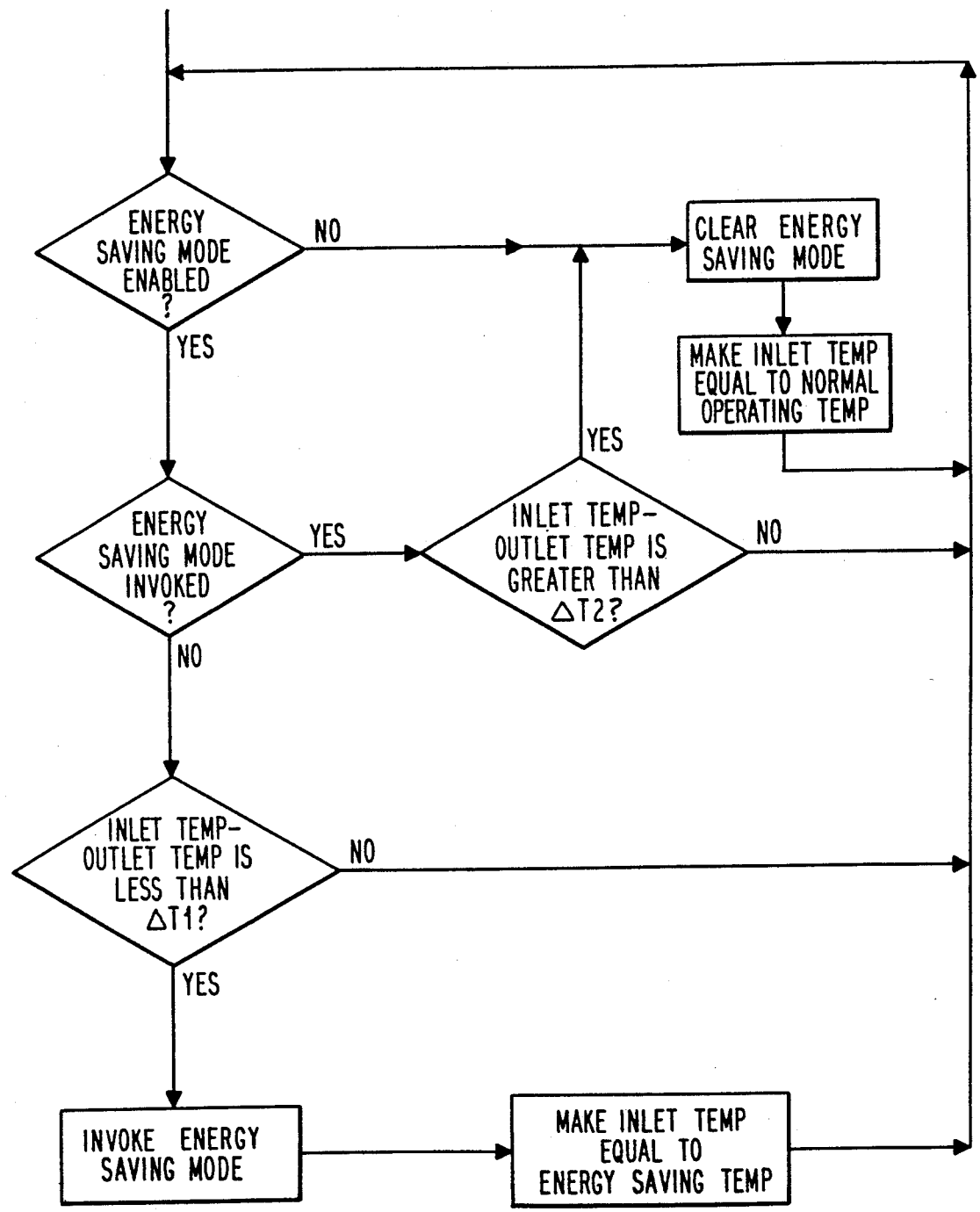
FIG. 3 is a flowchart showing the logic and operation of the invention.

FIG. 3 shows the logic of controller 40 in the form of a flowchart. In the preferred embodiment, the method of the invention may be practiced at the option of an operator by the selection of an energy saving mode, as indicated by the box marked "Energy Saving Mode Enabled?" If the method of the invention is not practiced, then the energy saving mode is not enabled, meaning that the inlet temperature of the drying medium is set equal to the inlet temperature of the drying medium in normal steady state operation. This is indicated in FIG. 3 by the arrow marked "No" leading from the box marked "Energy Saving Mode Enabled?" When the method of the invention is to be practiced, as indicated by the "Yes" arrow emanating from the box marked "Energy Saving Mode Enabled?", controller 40 next determines whether the energy saving mode has been invoked, as indicated by the box marked "Energy Saving Mode Invoked?" If the energy saving mode has not been previously invoked, controller 40 will calculate $\Delta T_{io}$ which is the difference between the normal operating inlet temperature and the outlet temperature of the drying medium, and controller 40 thereafter compares $\Delta T_{io}$ with the first pre-selected temperature difference $\Delta T_1$ as indicated in FIG. 3 by the box marked "Inlet Temp—Outlet Temp Is Less Than $\Delta T_1$?" If, during operation of dryer 8, the calculated difference $\Delta T_{io}$ between the normal operating inlet temperature and the outlet temperature of the drying medium drops below the first pre-selected temperature difference $\Delta T_1$ as shown by the "Yes" arrow emanating from the box marked "Inlet Temp—Outlet Temp Is Less Than $\Delta T_1$?", a stoppage or reduction in the normal steady-state flow of articles 50 has occurred and the logic of controller 40 invokes the energy saving mode. Under these circumstances, the inlet temperature of the drying medium is reduced from the normal operating level to the energy saving inlet temperature, as indicated by the box marked "Make Inlet Temp Equal to Energy Saving Temp." If, on the other hand, the difference $\Delta T_{io}$ between the normal operating inlet temperature and the outlet temperature of drying medium is not less than the first pre-selected temperature difference $\Delta T_1$ as indicated by the arrow marked "No" leading from the box marked "Inlet Temp—Outlet Temp Is Less Than $\Delta T_1$?", the logic of controller 40 leads back to the beginning of the cycle to determine whether the energy saving mode is enabled.

If the energy saving mode has been previously invoked, as indicated by the arrow marked "Yes" from the box marked "Energy Saving Mode Invoked?", controller 40 compares $\Delta T'_{io}$ which in this case is the difference between the energy saving inlet temperature and the outlet temperature of the drying medium, with the second pre-selected temperature difference $\Delta T_2$ as shown by the box marked "Inlet Temp—Outlet Temp Is Greater Than $\Delta T_2$?" If $\Delta T'_{io}$ exceeds the second pre-selected temperature difference $\Delta T_2$ thereby indicating that normal steady-state flow of articles 50 has resumed, controller 40 will "clear" the energy saving mode and instruct heater 17 to increase the inlet temperature of the drying medium to the normal operating level, as indicated by the box marked "Make Inlet Temp Equal to Normal Operating Temp." If, on the other hand, the difference $\Delta T'_{io}$ between the energy saving inlet temperature and the outlet temperature of the drying medium does not exceed the second pre-selected temperature difference $\Delta T_2$ as indicated by the arrow marked "No" emanating from the box marked "Inlet Temp—Outlet Temp Is Greater Than $\Delta T_2$?", controller 40 will maintain the inlet temperature of the drying medium at the energy saving level and return to the beginning of the logic cycle.

Figure 4:
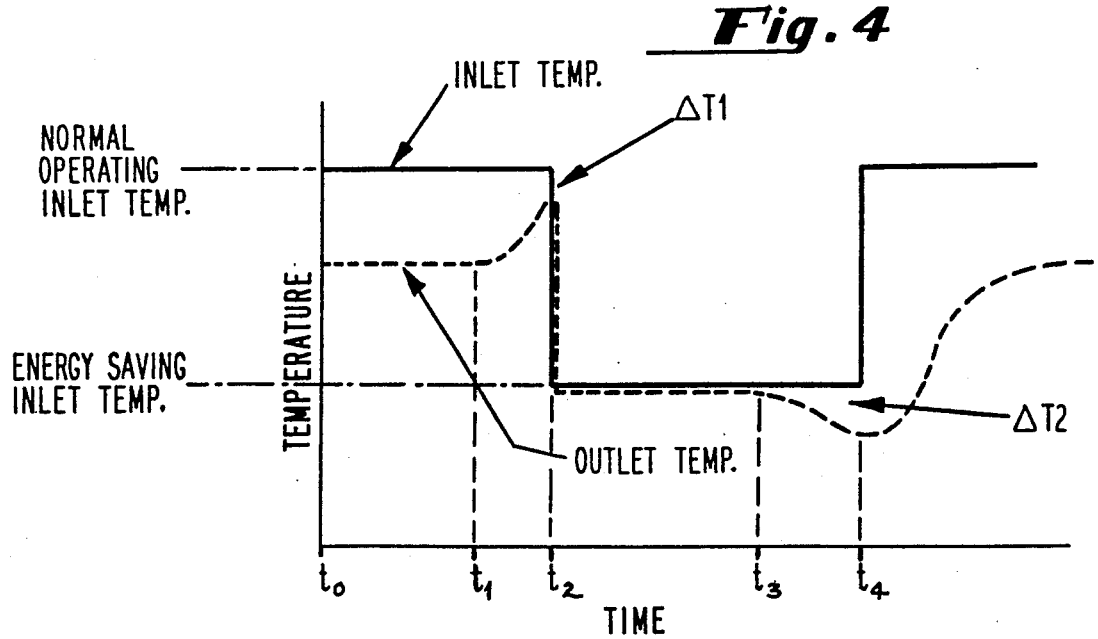
FIG. 4 is a graph of temperature versus time during the operation of the invention.

FIG. 4 is a graph that plots the inlet temperature and outlet temperature of the drying medium against time as the process of the invention is carried out. Viewing FIG. 4 in conjunction with FIG. 1, it will be seen that, during time $t_0$ through $t_1$ corresponding to normal steady-state operation of dryer 8, the inlet temperature of the drying medium (as determined by inlet temperature sensor 18) and the outlet temperature of the drying medium (as determined by outlet temperature sensor 19) are both constant. At time $t_1$ a stoppage or reduction in the normal steady-state flow of articles 50 through drying chamber 10 occurs and, as a result, the outlet temperature of the drying medium begins to increase. At time $t_2$ the difference $\Delta T_{io}$ between the normal operating inlet temperature and the outlet temperature of the drying medium becomes less than first preselected difference, $\Delta T_1$. At this point, the energy saving mode is invoked, as discussed above with reference to FIG. 3, and the inlet temperature of the drying medium is reduced by controller 40 to the preselected energy saving inlet temperature. Time period $t_2$ through $t_3$ represents the situation in which the flow of articles 50 has completely stopped and equilibrium conditions have been reached, thereby resulting in both the inlet temperature and the outlet temperature of the drying medium being constant and equal to the pre-selected energy saving inlet temperature. At time $t_3$ normal steady-state flow of articles 50 through the drying chamber 10 resumes. Accordingly, the outlet temperature of the drying medium begins to decrease and, at time $t_4$ the difference $\Delta T'_{io}$ between the energy saving inlet temperature and the outlet temperature of the drying medium reaches the second preselected temperature difference, $\Delta T_2$. At this point, i.e., at time $t_4$ the flow of articles 50 has returned to the normal steady-state level and the energy saving mode is "cleared" as discussed above with reference to FIG. 3, in that controller 40 returns the inlet temperature of the drying medium to the normal operating level experienced during steady-state drying operations.

It will be understood that significant variation in the apparatus and method of invention may exist depending, among other things, upon the type of articles 50 being dried, the normal steady-state flow rate of articles 50 through dryer 8, the type and flow rate of the drying medium, and the configuration and insulating characteristics of drying chamber 10. As a result, and by way of example only, in the drying of certain plastics with air as the drying medium, the normal operating inlet temperature may be in the range of from about 150 degrees to about 700 degrees Fahrenheit, the first preselected temperature difference $\Delta T_1$ may be in the range of from about 10 degrees to about 100 degrees Fahrenheit, the energy saving inlet temperature may be in the range of from about 100 degrees to about 600 degrees Fahrenheit, and the second pre-selected temperature difference $\Delta T_2$ may be in the range of from about 10 degrees to about 50 degrees Fahrenheit.

It will further be understood that there are considerable variations that can be accomplished in an apparatus and method of the invention without departing from its scope. As a result, although the preferred embodiment of an apparatus and method of the invention has been described above, it is emphasized that the invention is not limited to the preferred embodiment, and there exist alternative embodiments that are fully encompassed within the invention's scope, which is intended only to be limited by the scope of the appended claims.

What is claimed is:

1. A method for drying articles, comprising the steps of:
   (a) causing a normal steady-state flow of a plurality of articles through a drying chamber while simultaneously causing a drying medium heated to a normal operating inlet temperature to pass through the drying chamber and contact the articles therein;
   (b) next detecting a stoppage or reduction in the normal steady-state flow of the articles through the drying chamber;
   (c) in response to detecting said stoppage or reduction in the normal steady-state flow of the articles, changing the normal operating inlet temperature of the drying, medium to an energy saving inlet temperature, said energy saving inlet temperature being less than said normal operating inlet temperature;
   (d) thereafter detecting a resumption of the normal steady-state flow of the articles through the drying chamber; and
   (e) in response to detecting said resumption of the normal steady-state flow of the articles through the drying chamber, increasing the energy saving inlet temperature of the drying medium to the level of the normal operating inlet temperature of the drying medium.

2. A method for drying articles as recited in claim 1, wherein the drying medium is air.

3. A method for drying articles, comprising the steps of
   (a) causing a normal steady-state flow of a plurality of articles through a drying chamber while simultaneously causing a drying medium heated to a normal operating inlet temperature to pass through said drying chamber and contact the articles therein;
   (b) next detecting the normal operating inlet temperature of the drying medium after it is heated and before it contacts the articles in the drying chamber;
   (c) thereafter detecting an outlet temperature of the drying medium after it has contacted the articles in the drying chamber;
   (d) next computing the difference between the normal operating inlet temperature of the drying medium and the outlet temperature of the drying medium after it has contacted the articles in the drying chamber;
   (e) thereafter comparing to a first pre-selected temperature difference said difference between the normal operating inlet temperature of the drying medium and the outlet temperature of the drying medium after it has contacted the articles;
   (f) when said difference between the normal operating inlet temperature and the outlet temperature of the drying medium after it has contacted the articles is less than the first pre-selected temperature, thereafter changing the normal operating inlet temperature of the drying medium to an energy saving inlet temperature, said energy saving inlet temperature being less than the normal operating inlet temperature of the drying medium;
   (g) next computing the difference between the energy saving inlet temperature and the outlet temperature of the drying medium after it has contacted the articles;
   (h) thereafter comparing to a second pre-selected temperature difference said difference between the energy saving inlet temperature and the outlet temperature of the drying medium after it has contacted the articles; and,
   (i) when the difference between the energy saving inlet temperature and the outlet temperature of the drying medium after it has contacted the articles is greater than the second pre-selected temperature difference, thereafter increasing the energy saving inlet temperature of the drying medium to the normal operating inlet temperature of the drying medium.

4. A method of drying articles as recited in claim 3, wherein the drying medium is air.

5. A method of drying articles, as recited in claim 3, wherein:
   (a) said normal operating inlet temperature of the drying medium is between 150 degrees and 700 degrees Fahrenheit;
   (b) said first pre-selected temperature difference is between 10 degrees and 100 degrees Fahrenheit;

(c) said energy saving inlet temperature of the drying medium is between 100 degrees and 600 degrees Fahrenheit; and (d) said second pre-selected temperature difference is between 10 degrees and 50 degrees Fahrenheit.

6. A method of drying articles, as recited in claim 5, wherein the drying medium is air.

7. A method for drying articles, comprising the steps of:

(a) causing a normal steady-state flow of a plurality of articles through a drying chamber while simultaneously causing a drying medium heated to a normal operating inlet temperature to pass through said drying chamber and contact the articles therein so long as the difference between the normal operating inlet temperature and an outlet temperature of the drying medium detected after the drying medium has contacted the articles in said drying chamber is greater than a first pre-selected temperature difference;

(b) when the difference between the normal operating inlet temperature and the outlet temperature of the drying medium is less than the first pre-selected temperature difference, reducing the normal operating inlet temperature of the drying medium to an energy saving inlet temperature, said energy saving inlet temperature being less than the normal operating inlet temperature; and (c) increasing the energy saving inlet temperature of the drying medium to the normal operating inlet temperature when the difference between the energy saving inlet temperature and the outlet temperature of the drying medium is greater than a second pre-selected temperature difference.

8. A method for drying articles as recited in claim 7, wherein the drying medium is air.

9. A method for drying articles as recited in claim 7, wherein:

(a) said normal operating inlet temperature of the drying medium is between 150 degrees and 700 degrees Fahrenheit;

(b) said first pre-selected temperature difference is between 10 degrees and 100 degrees Fahrenheit;

(c) said energy saving inlet temperature of the drying medium is between 100 degrees and 600 degrees Fahrenheit; and (d) said second pre-selected temperature difference is between 10 degrees and 50 degrees Fahrenheit.

10. A method for drying articles as recited in claim 9, wherein said drying medium is air.

11. A method for drying articles, comprising the steps of:

(a) determining whether an energy saving mode is invoked;

(b) if said energy saving mode, is not invoked, (i) causing a drying medium heated to a normal operating inlet temperature to pass through a drying chamber having articles therein, (ii) detecting said normal operating inlet temperature of the heated drying medium, (iii) detecting an outlet temperature of the heated drying medium after the heated drying medium has contacted the articles in the drying chamber, and (iv) invoking said energy saving mode when a temperature difference between the normal operating inlet temperature of the drying medium and the outlet temperature of the drying medium is not greater than a first pre-selected temperature difference;

(c) if said energy saving mode is invoked, (i) causing a drying medium heated to an energy saving inlet temperature to pass through the drying chamber having articles therein, (ii) detecting said energy saving inlet temperature of the heated drying medium, (iii) detecting an outlet temperature of the heated drying medium after the heated drying medium has contacted the articles in the drying chamber, and (iv) clearing said energy saving mode when a temperature difference between the energy saving inlet temperature of the drying medium and the outlet temperature of the drying medium temperature is greater than a second pre-selected temperature difference.

12. An apparatus for drying articles with a heated drying medium, comprising:

(a) a drying chamber, having upper and lower portions, said upper portion of said drying chamber having an article inlet aperture and a drying medium outlet aperture formed therein, said lower portion of said drying chamber having an article outlet aperture and a drying medium inlet aperture formed therein, said drying chamber further having a drying zone defined by the location of the articles to be dried in said drying chamber;

(b) a drying medium conduit connected to the drying medium inlet aperture formed in the drying chamber;

(c) a heater interposed within said drying medium conduit for the purpose of heating said drying medium before it enters said drying chamber;

(d) a blower positioned adjacent to said heater for the purpose of propelling said drying medium through said heater and into said drying chamber;

(e) said drying medium conduit, said drying medium inlet aperture, said drying zone, and said drying medium outlet aperture defining a drying medium flow path through said drying chamber;

(f) an inlet temperature sensor interposed within said drying medium flow path so that the temperature of said drying medium is sensed after said drying medium is heated by said heater and before said drying medium enters the drying zone of said drying chamber;

(g) an outlet temperature sensor interposed within said drying medium flow path so that the temperature of the drying medium is sensed after it exits the drying zone of said drying chamber;

(h) a controller electrically connected to the inlet temperature sensor, to the outlet temperature sensor, and to the heater, said controller including: (i) means for controlling the heater so that the inlet temperature of the drying medium sensed by the inlet temperature sensor is maintained at a normal operating inlet temperature so long as the difference between the normal operating inlet temperature and the outlet temperature of the drying medium sensed by the outlet temperature sensor is greater than a first preselected temperature difference, (ii) means for controlling the heater so that the inlet temperature of the drying medium sensed by the inlet temperature sensor is reduced to an energy saving inlet temperature that is less than the normal operating inlet temperature when the difference between the normal operating inlet temperature and the outlet temperature of the drying medium sensed by the outlet temperature sensor is less than the first pre-selected temperature difference, and (iii) means for controlling the heater so that, after the inlet temperature of the drying medium sensed by the inlet temperature sensor has been reduced to the energy saving inlet temperature, the inlet temperature of the drying medium sensed by the inlet temperature sensor is increased to the normal operating inlet temperature of the drying medium when the difference between the energy saving inlet temperature and the outlet temperature of the drying medium sensed by the outlet temperature sensor is greater than a second pre-selected temperature difference.

13. An apparatus as recited in claim 12, wherein said outlet temperature sensor is interposed within said drying medium outlet aperture.

14. An apparatus as recited in claim 12, wherein said outlet temperature sensor is interposed within said drying chamber above said drying zone.

15. An apparatus as recited in claim 12, wherein said inlet temperature sensor is a thermocouple.

16. An apparatus as recited in claim 12, wherein said outlet temperature sensor is a thermocouple.

17. An apparatus as recited in claim 12, wherein said inlet temperature sensor is interposed within said drying medium conduit.

18. An apparatus as recited in claim 12, wherein said heater is of the radiant electric type.

19. An apparatus as recited in claim 12, wherein said drying chamber has a substantially cylindrical horizontal crosssection.

20. An apparatus as recited in claim 19, wherein said drying chamber has a floor having an inverted frustoconical shape terminating in said article outlet aperture.

21. An apparatus as recited in claim 20, wherein said drying medium inlet aperture is formed in said floor of said drying chamber.

22. An apparatus as recited in claim 12, wherein said controller further comprises:
(a) calculating means for calculating: (i) the temperature difference between the normal operating inlet temperature of the drying medium and the outlet temperature of the drying medium sensed by the outlet temperature sensor, and (ii) the temperature difference between the energy saving inlet temperature of the drying medium and the outlet temperature of the drying medium sensed by the outlet temperature sensor;
(b) comparison means for comparing: (i) the temperature difference between the normal operating inlet temperature of the drying medium and the outlet temperature of the drying medium to the first pre-selected temperature difference, and (ii) the temperature difference between the energy saving inlet temperature of the drying medium and the outlet temperature of the drying medium to the second pre-selected temperature difference.

* * * * *